(12) United States Patent
Chao

(10) Patent No.: US 7,198,364 B1
(45) Date of Patent: *Apr. 3, 2007

(54) EYEGLASS COMBINATION HAVING AN AUXILIARY FRAME

(75) Inventor: David Yinkai Chao, Towson, MD (US)

(73) Assignee: Contour Optik, Inc., Chiayl (TW)

( * ) Notice: Subject to any disclaimer, the term of this patent is extended or adjusted under 35 U.S.C. 154(b) by 0 days.

This patent is subject to a terminal disclaimer.

(21) Appl. No.: 09/648,071

(22) Filed: Aug. 25, 2000

Related U.S. Application Data

(63) Continuation of application No. 08/847,711, filed on Apr. 28, 1997, now Pat. No. 6,109,747.

(51) Int. Cl.
*G02C 9/00* (2006.01)
(52) U.S. Cl. .......................................... 351/47; 351/57
(58) Field of Classification Search ................. 381/47, 381/57, 48, 58, 41
See application file for complete search history.

(56) References Cited

U.S. PATENT DOCUMENTS

| | | | | |
|---|---|---|---|---|
| 5,568,207 A | * | 10/1996 | Chao | 351/47 |
| 5,737,054 A | * | 4/1998 | Chao | 351/47 |
| 6,109,747 A | * | 8/2000 | Chao | 351/47 |
| 6,149,269 A | | 11/2000 | Madison | |

* cited by examiner

*Primary Examiner*—Hung Xuan Dang
(74) *Attorney, Agent, or Firm*—Greenberg Traurig LLP

(57) ABSTRACT

An eyeglass combination includes a primary frame having a bridge and two side studs. An auxiliary frame includes a bridge and two side extensions each having a rear flange for engaging with the stud and for allowing the auxiliary frame to be secured to typical primary frame. The rear flanges each includes a magnet for engaging with another magnet engaged in the studs or for engaging with the studs of magnetic material. The magnets are preferably disposed laterally.

10 Claims, 1 Drawing Sheet

EYEGLASS COMBINATION HAVING AN AUXILIARY FRAME

This application is a continuation of application Ser. No. 08/847,711 filed on Apr. 28, 1997, now U.S. Pat. No. 6,109,747.

BACKGROUND OF THE INVENTION

1. Field of the Invention

The present invention relates to a pair of eyeglasses, and more particularly to a pair of eyeglasses having an auxiliary frame for supporting auxiliary lenses.

2. Description of the Prior Art

The closest prior art of which applicant is aware is U.S. Pat. No. 5,568,207 to Chao and has been assigned to the present assignee. The primary frame are required to be engaged with magnets for actuating with the magnets engaged in the auxiliary frame, such that the auxiliary frame may not be attached to typical spectacle frame having no magnets therein.

The present invention has arisen to mitigate and/or obviate the afore-described disadvantages of the conventional auxiliary spectacle frames.

SUMMARY OF THE INVENTION

The primary objective of the present invention is to provide an auxiliary frame for attaching typical spectacle frame having no magnets therein.

The other objective of the present invention is to provide a primary frame and an auxiliary frame having magnets disposed laterally.

In accordance with one aspect of the invention, there is provided an eyeglass combination comprising a primary frame including a first bridge and including two sides each having a stud, and an auxiliary frame for disposing in front of the primary frame, the auxiliary frame including a second bridge and including two sides each having an extension extended rearward toward the primary frame and extended over the studs, the extensions each including a rear end having a first flange extended downward for engaging with the stud and for securing the auxiliary frame to the primary frame.

The studs of the primary frame are made of magnetic material, the first flanges each includes a magnet for engaging with the studs of magnetic material and for securing the auxiliary frame to the primary frame.

The studs of the primary frame each includes a first magnet, the first flanges each includes a second magnet for engaging with the first magnet of the stud and for securing the auxiliary frame to the primary frame.

The first and the second magnets each includes a first pole and a second pole disposed in front of the first pole.

The second bridge includes an arm extended over the first bridge of the primary frame, the arm includes a rear end having a second flange extended downward for engaging with the first bridge and for securing the auxiliary frame to the primary frame.

The first bridge of the primary frame includes a first magnet, the second flange includes a second magnet for engaging with the first magnet of the first bridge and for securing the auxiliary frame to the primary frame.

In accordance with another aspect of the invention, there is provided an eyeglass combination comprising a primary frame including a first bridge, the first bridge including a first magnet, and an auxiliary frame for disposing in front of the primary frame, the auxiliary frame including a second bridge having an arm extended rearward toward the primary frame and extended over the first bridge, the arm including a rear end having a flange extended downward for engaging with the first bridge and for securing the auxiliary frame to the primary frame, the flange including a second magnet for engaging with the first magnet and for securing the auxiliary frame to the primary frame.

In accordance with the other aspect of the invention, there is provided an eyeglass combination comprising a primary frame including a first bridge and including two sides each having a stud, and an auxiliary frame for disposing in front of the primary frame, the auxiliary frame including a second bridge and including two sides each having an extension extended rearward toward the primary frame and extended over the studs, the second bridge including an arm extended rearward, the extensions and the arm each including a rear end having a flange extended downward for engaging with the stud and the first bridge and for securing the auxiliary frame to the primary frame.

The studs and the first bridge of the primary frame are made of magnetic material, the flanges each includes a magnet for engaging with the studs and the first bridge of magnetic material and for securing the auxiliary frame to the primary frame.

Further objectives and advantages of the present invention will become apparent from a careful reading of a detailed description provided hereinbelow, with appropriate reference to accompanying drawings.

DETAILED DESCRIPTION OF THE PREFERRED EMBODIMENT

Figure 1:
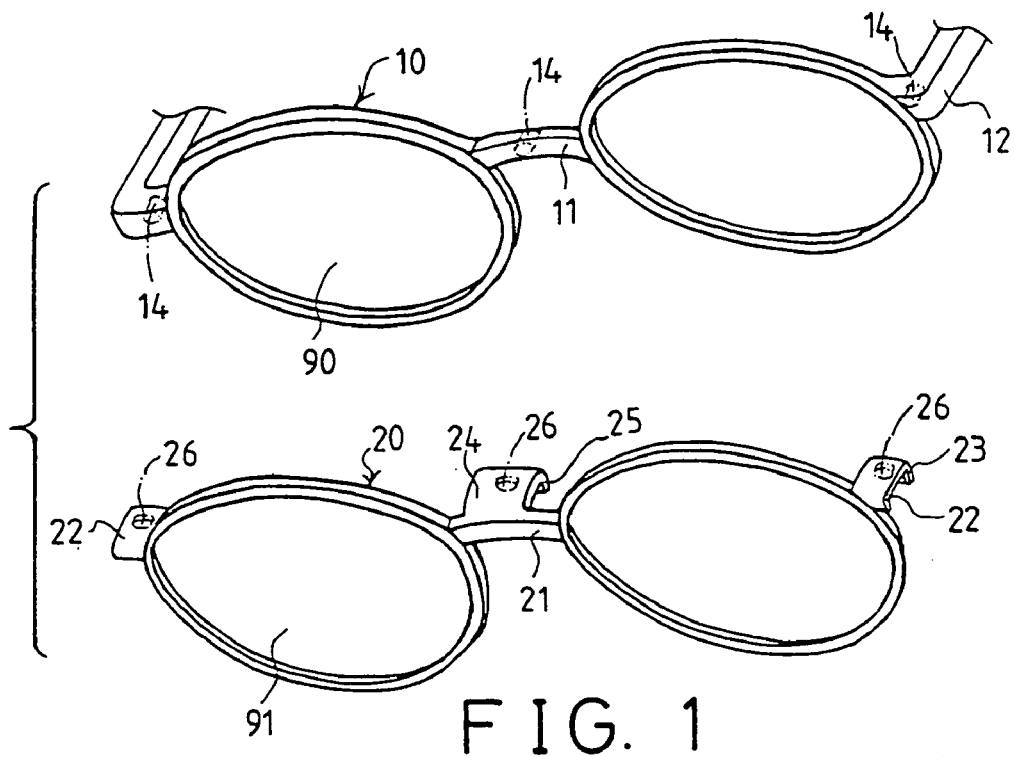
FIG. 1 is an exploded view of an eyeglass combination having an auxiliary frame in accordance with the present invention.
Figure 2:
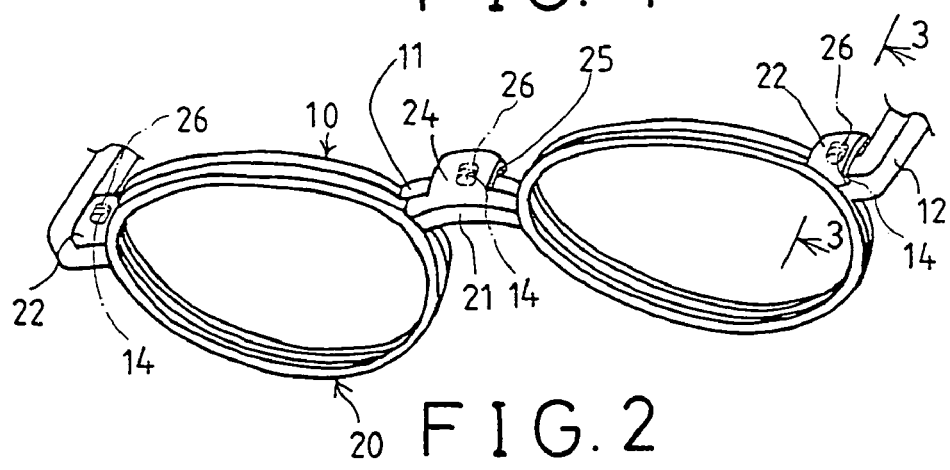
FIG. 2 is a perspective view of the eyeglass combination.
Figure 3:
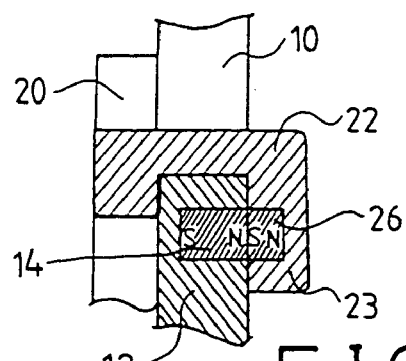
FIG. 3 is a cross sectional view taken along lines 3—3 of FIG. 2.

Referring to the drawings, and initially to FIGS. 1 and 2, an eyeglass combination in accordance with the present invention comprises a primary frame 10 for supporting primary lenses 90 and including a bridge 11 formed in the middle and including two studs 12 formed in the side portions. The bridge 11 and the studs 12 each includes a magnet 14 disposed laterally having a pole (such as S as shown in FIG. 3) arranged in front of the other (N in FIG. 3).

An auxiliary frame 20 for supporting auxiliary lenses 91 and for disposing in front of the primary frame includes a bridge 21 and two extensions 22 disposed in the side portions and extended rearward for engaging over the bridge 11 and the studs 12 of the primary frame 10 respectively. The bridge 21 includes an arm 24 extended rearward. The extensions 22 and the arm 24 each includes a rear end having a flange 23, 25 dependent downward. The flanges 23, 25 each includes a magnet 26 disposed laterally having a pole (S in FIG. 3) arranged in front of the other (N in FIG. 3) for allowing the S pole to engage with the N pole of the magnet 14 of the primary frame 10.

It is to be noted that the flanges 23, 25 of the extensions 22 and of the arm 24 are extended downward for engaging with the studs 12 and the bridge 11 such that the flanges 23, 25 themselves form a hook means for securing the auxiliary frame 20 to the primary frame 10. In addition, the magnets 14, 26 are disposed laterally such that the flanges 23, 25 may further be stably and solidly attracted and retained in place.

It is further to be noted that the flanges 23, 25 may also be used to hook to the typical eyeglasses having no magnets engaged therein, such that the auxiliary frame 20 may be attached to any of the typical eyeglasses. Particularly, when the typical eyeglasses are made of metal or other magnetic materials, the magnets 26 of the auxiliary frame 20 may also be used for attracting the typical eyeglasses and may also be used for solidly securing the auxiliary frame to the typical eyeglasses.

It is also to be noted that with only the arm 24 and the magnet 26 therein, the auxiliary frame 20 may also be solidly secured to the primary frame 10. Without the arm 24 and without the magnets 26, the auxiliary frame 20 may also be secured to the primary frame 10 by engaging the flanges 23 with the studs 12. The provision of the magnets 26 and 14 may further solidly secure the auxiliary frame 20 to the primary frame 10.

Accordingly, the eyeglass combination in accordance with the present invention includes an auxiliary frame having a pair of extensions and/or an arm for engaging with the studs and/or the bridge of the primary frame, for allowing the auxiliary frame to be secured to various kinds of eyeglasses having no magnets therein. In addition, the provision of the flanges 23, 25 may also be used for solidly securing the auxiliary frame to the primary frame 10.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. An eyeglass combination comprising:
    a primary frame comprising, a first bridge and two sides, each side having a stud, each stud including a magnetic material;
    an auxiliary frame comprising a second bridge and two sides, each side having an extension, and each extension including a rear end having a first flange extended downward relative to the remaining portion of the extension, each flange including a magnetic material;
    each extension extending across the corresponding stud, and the magnetic materials of at least one of the auxiliary frame or the primary frame being permanent magnets;
    each magnetic material of the primary frame engages, in a plane substantially parallel to a plane of a lens of the primary frame, with the corresponding magnetic materials of the auxiliary frame such that the auxiliary frame is secured to and supported by the primary frame; and
    the flanges are located behind the studs to reduce the likelihood of the auxiliary frame being disengaged from the primary frame if the auxiliary frame is pulled forward relative to the primary frame.

2. The eyeglass combination according to claim 1, wherein the flange of the auxiliary frame is the magnetic material.

3. The eyeglass combination according to claim 1, wherein each of the magnetic materials includes a first pole and a second pole disposed in front of said first pole.

4. The eyeglass combination according to claim 1, wherein the second bridge further includes an arm extended over the first bridge, the arm of the second bridge including a rear end having a second flange extended downward relative to the remaining portion of the arm for engaging with the first bridge and for securing the auxiliary frame to the primary frame.

5. The eyeglass combination according to claim 4, wherein the first bridge further includes a magnetic material for engaging with a magnetic material of the second flange and for securing the auxiliary frame to the primary frame.

6. An auxiliary frame comprising:
    a bridge and two sides, each side having an extension, and each extension including a rear end having a first flange extended downward relative to the remaining portion of the extension, each flange including a magnetic material;
    each extension being capable of extending across a corresponding stud of a primary frame, and capable of engaging a magnetic material of the primary frame, in a plane substantially parallel to a plane of a lens of the primary frame, with the corresponding magnetic materials of the auxiliary frame such that the auxiliary frame is capable of being secured to and supported by the primary frame, and when the auxiliary frame is located in front of the primary frame, the flanges are located behind the studs to reduce the likelihood of the auxiliary frame being disengaged from the primary frame if the auxiliary frame is pulled forward relative to the primary frame.

7. The eyeglass combination according to claim 6, wherein the flange of the auxiliary frame is the magnetic material.

8. The eyeglass combination according to claim 6, wherein each of the magnetic materials includes a first pole and a second pole disposed in front of said first pole.

9. The eyeglass combination according to claim 6, wherein the bridge of the auxiliary frame further includes an arm extended over a bridge of the primary frame, the arm of the bridge of the auxiliary frame including a rear end having a second flange extended downward relative to the remaining portion of the arm for engaging with the bridge of the primary frame and for securing the auxiliary frame to the primary frame.

10. The eyeglass combination according to claim 9, wherein the bridge of the primary frame further includes a magnetic material for engaging with a magnetic material of the second flange and for securing the auxiliary frame to the primary frame.

* * * * *